UNITED STATES PATENT OFFICE 2,605,239

COPRECIPITATED SILVER-BERYLLIUM OXIDE CATALYST

George W. Sears, Jr., Wilmington, Del., assignor to E. I. du Pont de Nemours & Company, Wilmington, Del., a corporation of Delaware No Drawing. Application June 23, 1949, Serial No. 100,981

4 Claims. (Cl. 252—475)

This invention relates to catalysts. More particularly it relates to catalyst compositions adapted to catalyze vapor-phase oxidation of ethylene oxide which contain metallic silver as an essential catalytic agent in admixture with a small amount of beryllium oxide, the metallic silver-beryllium oxide mixture being obtained by a coprecipitation procedure.

It is an object of this invention to provide improved catalyst compositions for the oxidation of ethylene. It is a further object to provide catalysts which are well-suited for use in a fluid-flow or boiling-bed vapor-phase process for the oxidation of ethylene. Further objects will become apparent hereinafter.

The foregoing and other objects of the invention are attained by means of a catalyst composition containing as an active catalytic material a mixture obtained by coprecipitating a reducible oxygen-containing compound of silver and a corresponding compound of beryllium from a solution of a silver compound and a beryllium compound and then reducing the coprecipitate to a mixture of metallic silver and beryllium oxide.

The term "catalyst composition" is used herein to refer to the total solid mixture with which gaseous reactants are contacted to effect the catalytic reaction. Thus the term includes not only the silver-containing active catalytic material but also all other materials in the solid mixture such as carriers, supports, diluents, promoters and conditioning agents.

The expression "reducible oxygen-containing compound of silver" refers to inorganic or organic silver compounds from which metallic silver may be obtained by reducing either thermally or chemically. Such compounds include silver oxide, silver carbonate, silver nitrate and such organic compounds as the silver salts of carboxylic acids such as formic, acetic, propionic, butyric, isobutyric, valeric, oxalic, malic, malonic, lactic, and maleic acids. The term "corresponding compound of beryllium" refers to similar beryllium compounds such as beryllium hydroxide, beryllium carbonate, beryllium nitrate, and organic beryllium compounds such as the formate, acetate, propionate, oxalate and maleate.

In preparing the silver-beryllium oxide catalyst mixtures of the invention, a solution containing both a silver salt and a beryllium salt is first prepared as, for example, by dissolving silver nitrate and beryllium nitrate in water. The silver and beryllium are coprecipitated from the solution as their corresponding water-insoluble oxides or hydroxides, carbonates or carboxylic acid salts by addition of an appropriate reagent. The coprecipitate is then reduced either by heating or chemically by treating with reducing gases such as ethylene, hydrogen, or carbon monoxide to give a metallic silver-beryllium oxide mixture. Preferably the metals are coprecipitated as their hydroxides, oxides, or carbonates from an aqueous solution of their nitrate salts. The coprecipitates may also be obtained by first preparing an alkali metal beryllate, as by reacting beryllium nitrate with excess alkali metal hydroxide, and then adding the alkali metal beryllate to a silver nitrate solution to coprecipitate the metals as their oxides or hydroxides.

The beryllium oxide is present in relatively small amounts on a weight basis in the compositions of the invention. The silver:beryllium weight ratio may be as low as 10:1 but more preferably it is from 50:1 to 5000:1; and in preparing the catalyst mixture, the relative amounts of silver and beryllium compounds employed are adjusted accordingly.

In addition to the presence of finely-divided silver as an essential catalytic agent and the presence of a small amount of beryllium oxide, the compositions of the invention may also include small quantities of materials capable of acting as promoters. Suitable promoters include metals such as copper, aluminum, manganese, cobalt, iron, magnesium, gold, thorium, nickel, cadmium, cerium and zinc. These promoters may be used singly or in combination and may be incorporated with the silver-beryllium oxide catalyst in any suitable manner such as by mechanical mixture or coprecipitation.

The metallic silver-beryllia catalytic mixtures of the invention are extremely active. While they may be advantageously employed for some purposes without resorting to the use of a support or carrier, it is preferred, particularly for use in a so-called fluid-flow process, that the catalytic mixtures be deposited upon a divided granular solid support or carrier. There may be employed any of the various materials suggested in the art as supports, carriers or diluents such as firebrick, alumina, corundum, alundum, pumice, silica gel, calcined diatomaceous earth, zeolites or other aluminum silicates such as analcite, natrolite and nephelite.

The metallic silver-beryllium oxide containing catalytic mixture may be applied to the carrier or support and made adherent thereto or dispersed thereon in any of the manners previously employed in the preparation of silver catalysts. If desired, a mixture of a silver compound and a beryllium compound may be applied to the support and the mixture then either thermally or chemically reduced in order to present the metallic silver-beryllia mixture on the carrier as an active catalyst.

The amount of silver present in the dispersion of the silver-beryllia containing catalytic material on or in a carrier may be varied, but it will ordinarily be found most economic to use from about 30 to 500 grams of silver per liter of total catalyst composition.

The selection of the particle size of the support or carrier will ordinarily follow the design of a specific process and apparatus. For use in boiling-bed or fluid-flow processes for the oxidation of ethylene, for which the catalyst compositions of this invention are particularly well suited, the carrier should have a particle size less than about 35 mesh. After a gas velocity has been selected, the specific particle size can be adjusted so that the catalyst composition can be suspended by the gas stream.

Catalyst compositions of the invention which have been found to have an unusually high activity and degree of selectivity for the vapor-phase oxidation of ethylene are those which contain a granular carrier or support and dispersed thereon a mixture containing metallic silver and beryllium oxide in proportions equivalent to a silver:beryllium weight ratio of from 100:1 to 1500:1, the silver being present in amount equal to about 75 to 200 grams per liter of the total catalyst composition. The silver-beryllium oxide catalytic mixtures employed in such compositions are prepared by coprecipitating a reducible oxygen-containing compound of silver and a corresponding compound of beryllium from a solution containing a soluble silver compound and a soluble beryllium compound in proportions equivalent to a silver:beryllium weight ratio of from 100:1 to 1500:1 and converting the coprecipitate to a mixture of metallic silver and beryllia either before or after dispersion of the catalytic mixture on the carrier.

In addition to the catalytic silver-beryllia mixture and the carrier or support, the total catalyst compositions of the invention may include other materials such as the conventional promoters and diluents, and also conditioning agents.

The catalyst compositions of the invention are valuable for making ethylene oxide by processes which comprise contacting a stream of ethylene and an oxygen-containing gas with the catalyst composition at a temperature of 150–400° C.

The following examples illustrate catalytic compositions of the invention, methods by which they are prepared and processes for their use.

*Example I*

250 parts by weight of silver nitrate and 8.25 parts by weight beryllium nitrate trihydrate (silver:beryllium weight ratio=400:1) are dissolved in 2500 parts by weight of water and to this a solution of 70 parts by weight of sodium hydroxide in 700 parts by weight of water is added rapidly with vigorous agitation. A coprecipitate forms and is thoroughly washed with water, then with acetone, and dried by heating at 70° C.

The dried coprecipitate is mixed with granular calcined diatomaceous earth (80–200 mesh) in the proportions of 425 grams of the dried coprecipitate for each liter of the calcined diatomaceous earth and this mixture is slurried in acetone. The acetone is permitted to evaporate while stirring the slurry in order to obtain a free-flowing, dry, coprecipitate-coated, calcined diatomaceous earth. The coating is then reduced at 175° C. with 1% ethylene in nitrogen.

The coated calcined diatomaceous earth is mixed with uncoated calcined diatomaceous earth in the proportions of 770 ml. of the coated material for each liter of the uncoated material to form the finished catalyst composition. Operating this catalyst composition at 240° C. in a so-called boiling-bed type process with a feed of 10% ethylene in air containing 1.5 p. p. m. of tetrachloroethylene at a space velocity of 1800 hr.$^{-1}$ and a linear gas velocity of 0.5 ft. per second, 40 to 45% of the ethylene fed reacts, 60–65% forming ethylene oxide and the remainder forming carbon dioxide and water.

*Example II*

To 95 parts by weight of silver nitrate and 1.4 parts by weight of beryllium nitrate tetrahydrate (silver:beryllium weight ratio=1000:1) in 1000 parts by weight of water, 24 parts by weight of sodium hydroxide in 200 parts by weight of water is added with vigorous stirring. The resulting coprecipitate is thoroughly washed with water and then with acetone and dried at 70° C. 27 parts by weight of this coprecipitate is stirred with 100 parts by weight of 80–200 mesh tabular alumina in acetone until the acetone evaporates. The silver oxide is then reduced at 190° C. with 5% ethylene in air.

The reduced material is mixed with an additional 240 parts by weight of 80–200 mesh tabular alumina to form a finished catalyst composition. Operating this catalyst in a boiling-bed process at 220° C. with a feed of 10% ethylene in air containing 3 p. p. m. hydrogen chloride at a space velocity of 800 hr.$^{-1}$ and a linear gas velocity of 0.3 ft. per second, 40% of the added ethylene reacts, 70% forming ethylene oxide and 30% forming carbon dioxide and water.

*Example III*

47.2 parts by weight of silver nitrate and 2.08 parts by weight of beryllium nitrate trihydrate (silver:beryllium weight ratio=300:1) in 1200 parts by weight of water are reacted with 12 parts by weight of sodium hydroxide in 125 parts by weight of water. The coprecipitate is washed and dried as in Example I and is then slurried in acetone with a caustic-treated aluminum silicate cracking catalyst in the proportions of 420 parts by weight of the coprecipitate for each liter of the aluminum silicate. After drying the silver oxide is reduced at 180° C. with 5% ethylene in nitrogen.

The coated aluminum silicate obtained following the reduction step is mixed with uncoated aluminum silicate in the proportions of 300 ml. of the coated materials for each liter of the uncoated material to form the finished catalyst composition. Operating this catalyst in a boiling bed at 260° C. with a feed of 10% ethylene in air and 3 p. p. m. HCl at a space velocity of 1800 hr.$^{-1}$ and a linear gas velocity of 0.5 ft. per second, 40% of the added ethylene reacts, 65% forming ethylene oxide and the remainder forming carbon dioxide and water.

I claim:

1. A process for preparing a silver-beryllium oxide catalyst adapted to catalyze the oxidation of ethylene to ethylene oxide which comprises coprecipitating a reducible oxygen-containing compound of silver and a corresponding compound of beryllium in a silver:beryllium weight ratio of from 10:1 to 5000:1 from a solution of a silver compound and a beryllium compound and reducing the coprecipitate to a mixture of metallic silver and beryllium oxide.

2. A catalyst composition adapted to catalyze the oxidation of ethylene to ethylene oxide which comprises as an active catalytic material a silver-beryllium oxide mixture obtained by coprecipitating a reducible oxygen-containing compound of silver and a corresponding compound of beryllium in a silver:beryllium weight ratio of from 10:1 to 5000:1 from a solution of a silver compound and a beryllium compound and reducing the coprecipitate to a mixture of metallic silver and beryllium oxide.

3. A catalyst composition adapted to catalyze the oxidation of ethylene to ethylene oxide which comprises a divided granular carrier and as an active catalytic material a silver-beryllium oxide mixture, the silver constituting from 30 to 500 grams per liter of total catalyst composition, said silver-beryllium oxide mixture being obtained by coprecipitating a reducible oxygen-containing compound of silver and a corresponding compound of beryllium in a silver:beryllium weight ratio of from 10:1 to 5000:1 from a solution of a silver compound and a beryllium compound and reducing the coprecipitate to a mixture of metallic silver and beryllium oxide.

4. A catalyst composition adapted to catalyze the oxidation of ethylene to ethylene oxide which comprises a divided granular carrier and dispersed thereon as an active catalytic material a silver-beryllium oxide mixture, the silver constituting from 75 to 200 grams per liter of total catalyst composition, said silver-beryllium oxide mixture being obtained by coprecipitating a reducible oxygen-containing compound of silver and a corresponding compound of beryllium in a silver:beryllium weight ratio of from 100:1 to 1500:1 from a solution of the nitrates of said metals and reducing the coprecipitate to a mixture of metallic silver and beryllium oxide.

GEORGE W. SEARS, Jr.

REFERENCES CITED

The following references are of record in the file of this patent:

UNITED STATES PATENTS

| Number | Name | Date |
| --- | --- | --- |
| 2,354,892 | Thacker | Aug. 1, 1944 |
| 2,424,085 | Bergsteinsson et al. | July 15, 1947 |
| 2,424,086 | Bergsteinsson et al. | July 15, 1947 |
| 2,554,459 | Heider | May 22, 1951 |

OTHER REFERENCES

Berkman, "Catalysis," pp. 696–697, Reinhold Pub. Co., N. Y., 1940.